United States Patent
Sauer et al.

(10) Patent No.: US 7,823,960 B2
(45) Date of Patent: Nov. 2, 2010

(54) CUBBY HOLE DEVICE

(75) Inventors: Rolf Sauer, Oberhausen-Rheinhausen (DE); Oliver Guth, Harthausen (DE); Günter Plaggenborg, Oldenburg (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 425 days.

(21) Appl. No.: 11/719,345

(22) PCT Filed: Nov. 15, 2005

(86) PCT No.: PCT/EP2005/012402
§ 371 (c)(1),
(2), (4) Date: Apr. 18, 2008

(87) PCT Pub. No.: WO2006/050997
PCT Pub. Date: May 18, 2006

(65) Prior Publication Data
US 2009/0008962 A1 Jan. 8, 2009

(30) Foreign Application Priority Data
Nov. 15, 2004 (DE) .................... 10 2004 055 654

(51) Int. Cl.
*B60R 7/06* (2006.01)
(52) U.S. Cl. ............... 296/187.05; 296/37.12
(58) Field of Classification Search ............ 296/24.34, 296/187.05, 37.8, 37.12, 37.1, 1.04; 224/483
See application file for complete search history.

(56) References Cited
U.S. PATENT DOCUMENTS

| | | | | |
|---|---|---|---|---|
| 5,413,317 A * | 5/1995 | Spoerre | ...................... | 267/134 |
| 5,845,954 A * | 12/1998 | DePue | ...................... | 296/37.12 |
| 5,887,930 A * | 3/1999 | Klein | ...................... | 296/37.12 |
| 5,951,083 A * | 9/1999 | Bittinger et al. | .......... | 296/37.12 |
| 6,131,242 A * | 10/2000 | Zipperle et al. | ................ | 16/82 |
| 6,299,208 B1 * | 10/2001 | Kasahara et al. | ............ | 280/752 |
| 6,896,308 B2 * | 5/2005 | Okanda et al. | ........... | 296/37.12 |
| 7,065,829 B2 * | 6/2006 | Okabayashi et al. | ........... | 16/51 |
| 7,311,328 B2 * | 12/2007 | Best et al. | .................... | 280/752 |
| 7,350,629 B2 * | 4/2008 | Anton et al. | ............... | 188/82.1 |
| 7,484,792 B2 * | 2/2009 | Penner | .................. | 296/187.05 |
| 7,651,157 B2 * | 1/2010 | Jonsson | ................. | 296/187.05 |
| 2008/0106110 A1 * | 5/2008 | Miki et al. | ............... | 296/37.12 |
| 2009/0091152 A1 * | 4/2009 | Matsui et al. | .............. | 296/37.8 |
| 2009/0134654 A1 * | 5/2009 | Clashman et al. | ........ | 296/37.12 |

* cited by examiner

*Primary Examiner*—Jason S Morrow
(74) *Attorney, Agent, or Firm*—Fay Kaplun & Marcin, LLP

(57) ABSTRACT

Described is a cubby hole device for vehicles which includes a cubby hole, a first holder, a second holder, a lock and a carrier. The carrier is connected, on the one hand, to an outer frame, on the other hand, to one of the two holders. The cubby hole is connected to the other of the two holders. The first holder and the second holder are mounted rotatably against each other. The lock locks the first holder and the second holder against each other. The cubby hole is displaced against the outer frame by high pressure produced in particular by impact of a vehicle occupant on the cubby hole as a result of which the carrier is deformed plastically by the high pressure and/or the first holder is deformed plastically and/or the first holder is rotated against the second holder. This displacement of the cubby hole by only the constructional elements which are related to the cubby hole.

17 Claims, 4 Drawing Sheets

CUBBY HOLE DEVICE

FIELD OF INVENTION

The present invention relates to a cubby hole device for vehicles, the cubby hole contained in the cubby hole device, for protection of the occupant during in particular an accident-related impact, being displaced against an outer frame on which the cubby hole is mounted.

BACKGROUND INFORMATION

Such a storage compartment is the subject of U.S. Pat. No. 5,413,379, the cubby hole configured as a glove compartment being able to be closed with a cover. This cover is supported on the car body structure via an energy-absorption element and thus permits an energy-absorbing deformation during impact of the occupant with his knee or calf region.

DE 1005551 discloses a glove compartment for a passenger vehicle, a deformable rod being mounted on the car body by means of which the cover of the glove compartment is supported. This rod deforms upon impact of the occupant on the cover of the glove compartment, this rod having a different deformation resistance in sections.

DE 42 43 791 discloses a knee catcher for an automotive vehicle which can be configured also as a glove compartment, the cover of the knee catcher being supported on the car body via a deformation member and being connected to the car body in its lower region via a four-bar linkage. During impact, the pivot axis of the knee catcher is displaced, as a result of which the accident-related impact of an occupant is damped.

The disadvantage of the prior art listed here is that additional components are required in order to ensure that, during an accident-related impact of an occupant on the cubby hole, the cubby hole is displaced in order to create space for the occupant and/or to damp the impact.

SUMMARY OF INVENTION

The present invention relates to a cubby hole device for vehicles, in which the cubby hole is displaced against the outer frame as a result of in particular an accident-related impact of an occupant without such additional components being required.

In particular, the present invention relates to a cubby hole device for vehicles, the cubby hole device comprising a cubby hole, a first holder, a second holder, a lock and a carrier, the carrier being connected, on the one hand, to an outer frame and the carrier being connected, on the other hand, to one of the two holders, and the cubby hole being connected to the other of the two holders, and the first holder and the second holder being mounted rotatably one in the other, and the lock locking the first holder and the second holder against each other in such a manner that the cubby hole is displaced against the outer frame by a high pressure produced in particular by impact of a vehicle occupant on the cubby hole, as a result of which the carrier is deformed plastically by the high pressure and/or the first holder is deformed plastically and/or the second holder is rotated against the first holder.

If a plastic deformation of the carrier is provided, the cubby hole is displaced with plastic deformation of the carrier in the direction of the force effect during impact. As a result of the plastic deformation of the carrier, energy is absorbed. Impact of an occupant can be specifically damped with corresponding choice of material of the carrier and a corresponding construction of the carrier, as a result of which the risk of injury is reduced. The same is true in the case where deformation of the first holder is provided in the case of impact. Here the cubby hole rotates via the hinge represented by the holders in the direction of the force effect, this rotational movement proceeding in a damped manner as a result of the plastic deformation.

As a result of the just-mentioned feature that the second holder rotates against the first holder, a pure rotational movement of the cubby hole is performed around the hinge represented by the holders in particular during impact. As a result, a protective effect for the occupant is ensured by increasing the space. The rotational movement is thereby designed advantageously such that the cover rotates away without force in the direction prescribed by the impact at least by 70 mm.

An advantageous embodiment of the invention provides that the lock comprises a displaceable bolt being guided in one of the two holders and the other holder having a retaining structure and the bolt being able to engage into this retaining structure in order to lock the first holder and the second holder against each other. As a result, fixing of the cubby hole in the desired position is possible, for example fixing the cubby hole in the closed state.

A further advantageous embodiment of the invention provides that the bolt is weakened such that the latter is broken under high pressure on the cubby hole in order to initiate a rotational movement of the cubby hole. As a result of the rotational movement of the cubby hole, space is made available for the occupant, as a result of which the danger of injury to the occupant is reduced. Weakening of the bolt can be implemented for example by the choice of a special material and/or by the choice of a specific shape.

A further advantageous embodiment of the invention provides that the retaining structure located on the other holder is weakened such that the latter is broken under high pressure on the cubby hole in order to initiate a rotational movement. The same advantages as when breaking the bolt guided in the other holder are produced here.

A further advantageous embodiment of the invention provides that the lock comprises providing a nose on one of the two holders, and providing an overlap on the other holder, and the overlap overlapping the nose in the locked state of the two holders. With such a lock, the cubby hole can be fixed in a position, for example in the position in the closed state of the cubby hole.

A further advantageous embodiment of the invention provides that the overlap is weakened such that the latter is broken under high pressure on the cubby hole in order to initiate a rotational movement.

A further advantageous embodiment of the invention provides that the nose is weakened such that the latter is broken under high pressure on the cubby hole in order to initiate a rotational movement.

A further advantageous embodiment of the invention provides that the carrier and the holder connected to the carrier are connected to each other in a form fit. As a result, a stable combination of carrier and holder is achieved whilst avoiding complex attachment means. If a deformation of the carrier is provided as a result of a rotational movement of the holder connected to the carrier, the course of this rotational movement can be influenced by the configuration of the form of the holder and the choice of material of the carrier. In particular, the form of the holder and the material of the carrier will be chosen such that damping which is as advantageous as possible is ensured for the protection of an occupant. The same is true in the reverse case in that the holder connected to the carrier is deformed and likewise in the case where this holder and the carrier are deformed together.

A further advantageous embodiment of the invention provides that the holder connected to the carrier has the basic shape of a cylinder. Bodies with a cylindrical shape are particularly easy to produce and are very stable because of their compactness.

A further advantageous embodiment of the invention provides that the holder connected to the carrier has one or more cams or teeth on its border. If a deformation of the carrier is provided as a result of a rotational movement of the holder connected to the carrier, the plastic deformation is also influenced by the shape of the cams or teeth. If the holder connected to the carrier has the basic shape of a cylinder, the plastic deformation is determined predominantly by these cams or teeth. As a result of the configuration of the cams, influence on the rotational movement can thus be achieved specifically in the case of exerting high pressure on the cubby hole. What has just been stated applies also to the reverse case in that the holder connected to the carrier is deformed and likewise in the case where this holder and the carrier are deformed together.

A further advantageous embodiment of the invention provides that if a deformation of the carrier is desired, the carrier comprises light metal, light metal foam, plastic material, plastic material foam, plastic material composite materials, steel or a composition of these materials. These materials are suitable for meeting the above-mentioned conditions with respect to plastic deformability.

A further advantageous embodiment of the invention provides that, if a deformation of the holder connected to the carrier is desired, the holder connected to the carrier comprises light metal, light metal foam, plastic material, plastic material foam, plastic material composite materials, steel or a composition of these materials. These materials are suitable to meet the above-mentioned conditions with respect to plastic deformability.

A further advantageous embodiment of the invention provides that the first holder and the second holder are mounted one in the other. A mounting of the first holder and of the second holder one in the other enables a reduction in the extension with respect to the spatial direction parallel to the axis of rotation of the cubby hole. The holders can be configured in particular such that the one holder guides the other holder in the rotational movement. Consequently, particular stability is provided for this system.

A further advantageous embodiment of the invention provides that the rotational movement of the first holder against the second holder is rotationally damped. The opening and closing of the cubby hole is consequently damped, in particular hard striking is avoided.

A further advantageous embodiment of the invention provides that the rotational damping is implemented in that a moveable, silicone-damped toothed wheel is mounted on one of the two holders and a toothed structure is mounted on the other holder, and the toothed wheel engages in the toothed structure. The damping is effected in this case in that the toothed wheel is mounted in silicone.

A further advantageous embodiment of the invention provides that the cubby hole is a glove compartment in an instrument panel.

BRIEF DESCRIPTION OF DRAWINGS

The invention is now explained with reference to an embodiment. The associated Figures show.

DETAILED DESCRIPTION

For the purposes of clarity of orientation, a Cartesian coordinate system with the axes x, y, z has been introduced.

Figure 1:
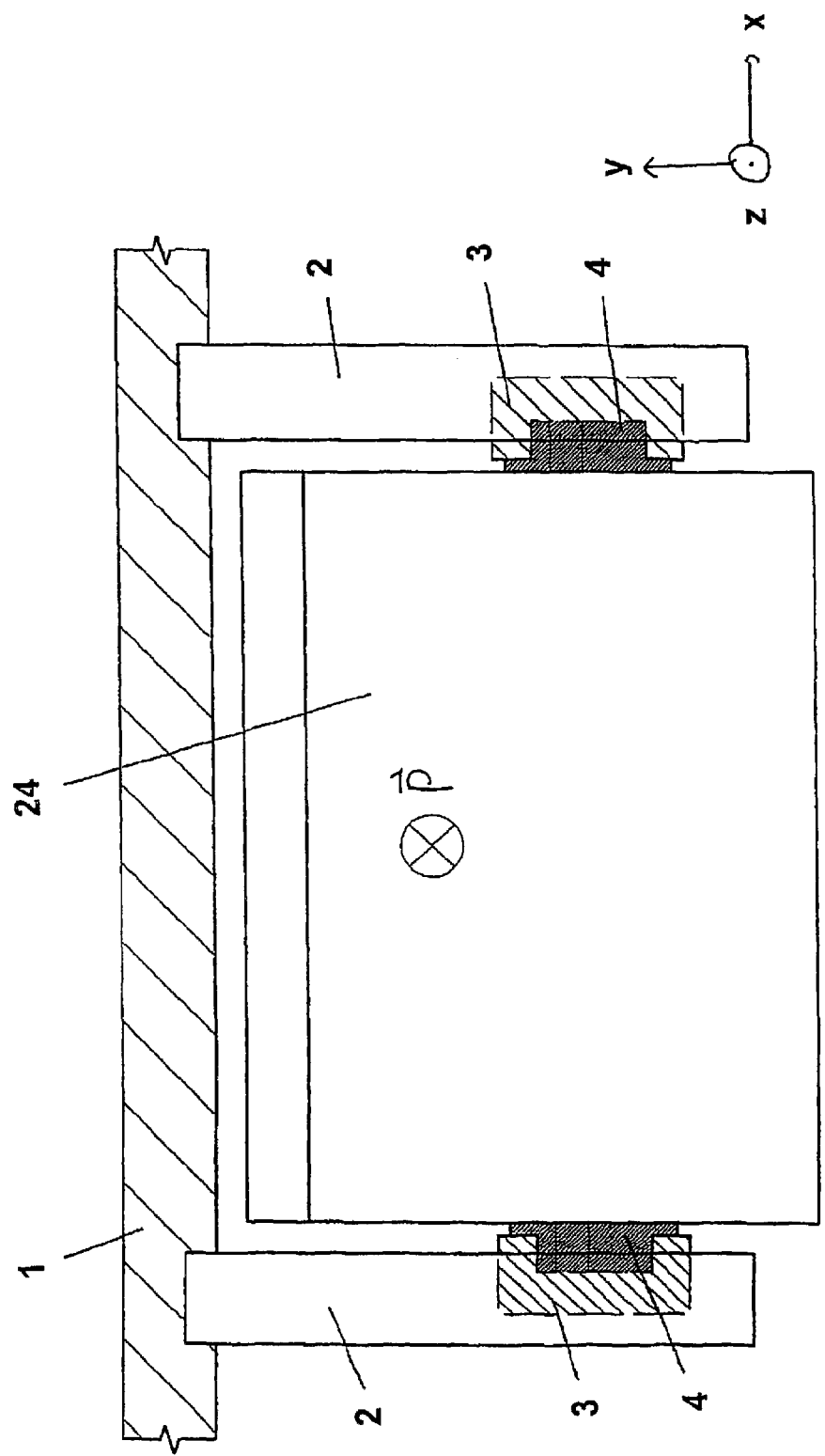
FIG. 1 shows schematically a front view of the cubby hole device mounted on an outer frame according to an exemplary embodiment of the present invention.

FIG. 1 shows schematically a front view of the cubby hole device mounted on an outer frame. On a frame 1, in this embodiment the body of a passenger vehicle, two carriers 2 are mounted parallel to each other, the spacing of these two carriers being somewhat wider than the width of a provided cubby hole 24. At the lower end of the carrier opposite the frame, a first holder 3 is integrated in the carrier in a form fit in each of the two carriers, the position of the two holders being chosen such that they are situated opposite each other. In these two holders, a second holder 4 respectively is mounted rotatably. A cubby hole 24 which is situated hence between the two carriers 2 is mounted on these two holders.

In this representation, the cubby hole 24 is directed towards an occupant. In the case of in particular an accident-related impact of an occupant, a high pressure "P" acts on the cubby hole 24 in the direction of the z axis.

Figure 2:
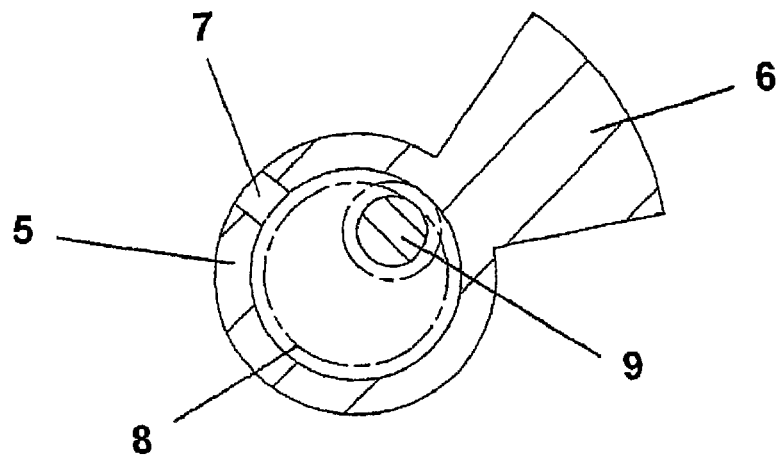
FIG. 2 shows the second holder in a side view.

FIG. 2 shows the second holder 4 in a side view. The second holder 4 has the shape of a cylinder 5 with a tab 6 which emerges from this cylinder, said tab extending approximately over a quarter of the circumference of the cylinder and the cross-sectional surface thereof being comparable with the cross-sectional surface of the cylinder. On the cylinder, situated opposite the tab at an angle of approx. 90°, a notch 7 is introduced. This notch is provided for a lock according to a first embodiment: a bolt which is guided in the first holder 3 can engage in this notch 7 in order to effect locking of the first holder 3 against the second holder 4.

Furthermore, the inner side of the cylinder 5 is provided with a circumferential toothed structure 8 in the holder 4 shown in FIG. 2. A toothed wheel 9 which is mounted in silicone and not shown here in more detail engages in this toothed structure. The toothed wheel itself is connected to the second holder 4. If the first holder 3 is now moved against the second holder 4 by opening or closing the cubby hole 24, this movement is damped by rotation of the silicone-damped toothed wheel 9. The extent to which the above-mentioned toothed structure 8 must have a circumferential configuration, depends upon the desired opening angle of the cubby hole 24; a partially circumferential toothed structure 8 is therefore also conceivable.

The second holder 4 can be produced from various materials, such as e.g. light metal, light metal foam, plastic material, plastic material foam, plastic material composite materials or steel materials. In this embodiment, the second holder 4 is manufactured from aluminium.

Figure 3:
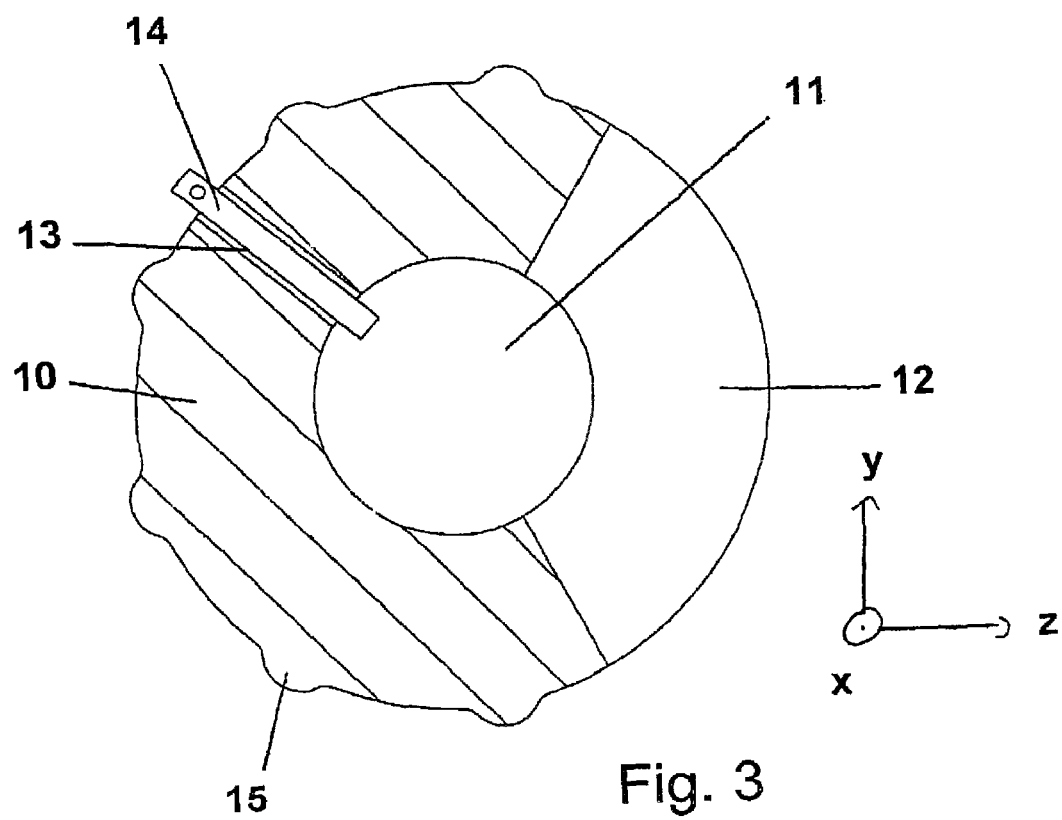
FIG. 3 shows the first holder in a side view.

FIG. 3 shows the first holder 3 in a side view. The first holder 3 has the basic shape of a cylinder 10. In the centre of this cylinder 10 there is a circular opening 11 which opens outwards in a specific angle region 12. This opening is configured in the dimensions thereof such that the second holder 4 can be mounted rotatably therein. In the edge thereof, the first holder 3 has a guide channel 13 for a bolt 14. The guide channel 13 and the bolt 14, according to a first embodiment, are provided for a lock. The first holder 3 is provided with a plurality of cams 15 on the outside thereof.

The first holder 3 can be produced from various materials, such as e.g. light metal, light metal foam, plastic material, plastic material foam, plastic material composite materials or steel materials. In this embodiment, the first holder 3 is manufactured from aluminium.

Figure 4:
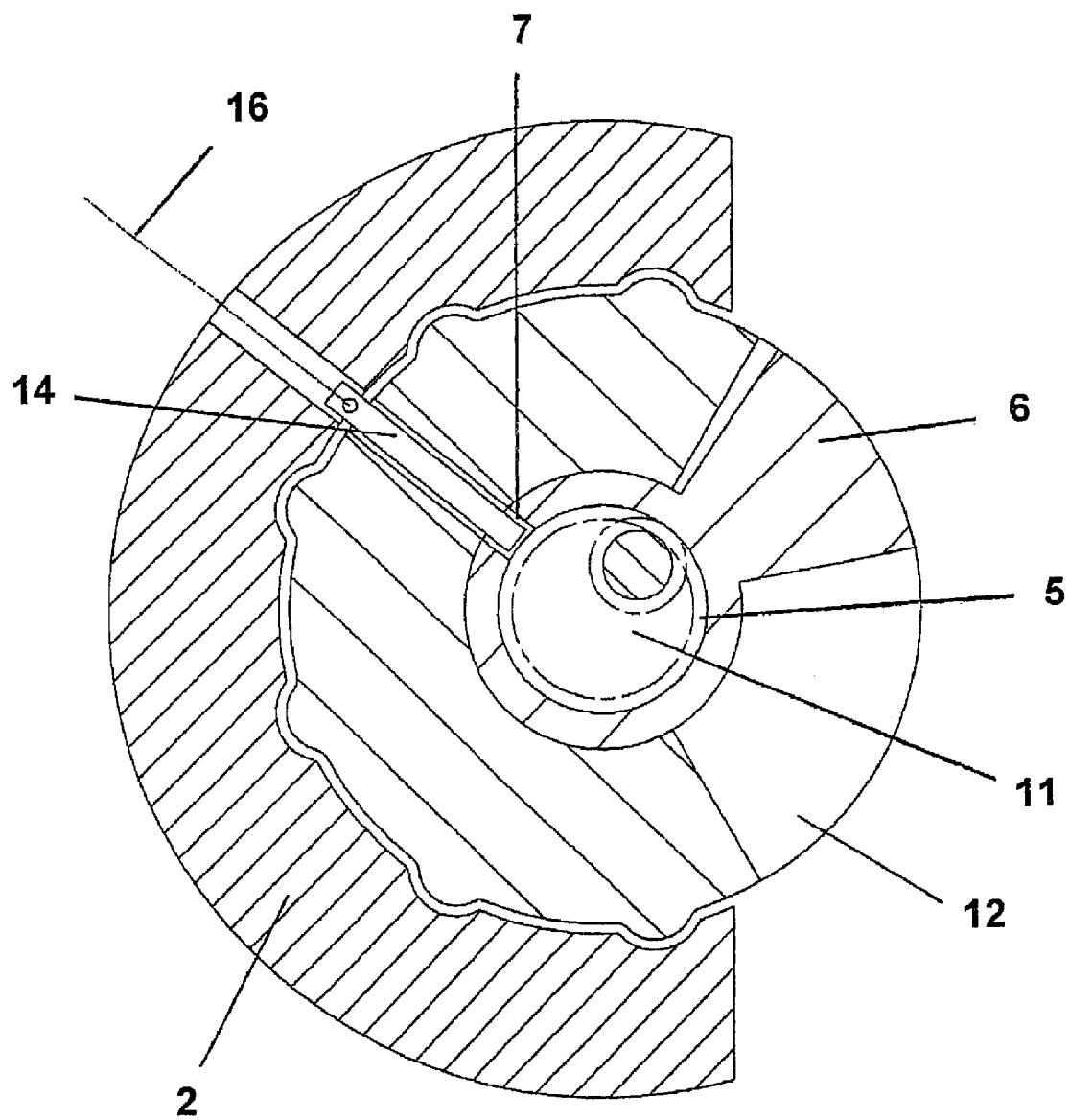
FIG. 4 shows the second holder, mounted in the first holder, with a lock according to a first embodiment, integrated in the carrier, in a side view.

FIG. 4 shows the second holder 4, mounted in the first holder, with a lock according to a first embodiment, integrated in the carrier, in a side view. In this Figure, it is detectable that the cylindrical part of the second holders is adapted to the circular opening 11 of the first holder. As a result, stable mounting of the first holder 3 in the second holder 4 is achieved and likewise also guidance of the second holder 4 during a rotational movement. The opening 11 contained in the first holder which opens in a specific angle region 12 is in addition configured such that the tab 6 of the second holder 4 can move freely within this angle region 12 in order to enable opening and closing of the cubby hole 24. In particular this angle region 12 is so great that the cubby hole 24, in the case of in particular an accident-related impact, can rotate beyond its opening or closing position further in the direction prescribed by the impact. If such a rotational movement is not provided, the angle region 12 can be configured such that the tab 6, when the cubby hole is open and/or closed, abuts against the surfaces of the first holder 3 which delimit the angle region 12.

FIG. 4 shows the situation in which the bolt 14 guided in the first holder 3 engages in the notch 7 of the second holder 4 and hence locks the two holders. The bolt 14 thereby comprises plastic material and is weakened at its lower end by notching. Alternatively, a bolt made of for example metal is also possible here, said bolt having a weakened region due to the general constructional design. The bolt is actuated via a Bowden cable 16 which is connected to a switch which is not shown in more detail. In the case of in particular an accident-related impact, the bolt 14 breaks off because of the high pressure on its end and in this way enables a rotational movement of the second holder 4 and hence also of the cubby hole 24. As an alternative, it is also possible that the retaining structure is broken under high pressure and in this way initiates a rotational movement. For example the shape of the notch can be chosen here, for example by bevelling, such that the bolt 14 is pressed out of the notch under high pressure, as a result of which rotational movement of the cubby hole 24 would likewise be initiated.

In addition, FIG. 4 shows that the first holder 3 is embedded in a form fit in the carrier 2. In the region in which the first holder 3 is embedded, the carrier 2 comprises aluminium foam, all materials which are energy-absorbing as a result of their structure would in principle be suitable. In the case of in particular an accident-related impact of an occupant on the cubby hole 24, this aluminium foam structure of the carrier 2 is deformed as a result of the torque effected by this pressure on the first holder 3 during the rotational movement of the first holder 3, as a result of which the impact of the occupant is slowed down. Alternatively, the First holder 3 can also be manufactured from a material which is easily plastically deformable and the carrier 2 from a material which is difficult to deform, or else carrier 2 and first holder 3 comprise a deformable material. As a result a similar effect to that described above would be achieved.

In this embodiment, the functionalities, such as opening mechanism of the cubby hole, rotational damping, opening angle delimitation of the cubby hole etc., are assigned to the holders 3 and 4. Holders 3 and/or 4 can be constructed as discs in order to ensure adjustment of the function during pre-assembly of the holders. The discs are assembled for example integrally or in a form fit. In this respect, a modular arrangement of components in disc form, advantageously integrally and/or in a form fit, is conceivable, on the axis about which the cubby hole 24 is tilted during opening and closing, each of these components assuming one or more functionalities.

Figure 5:
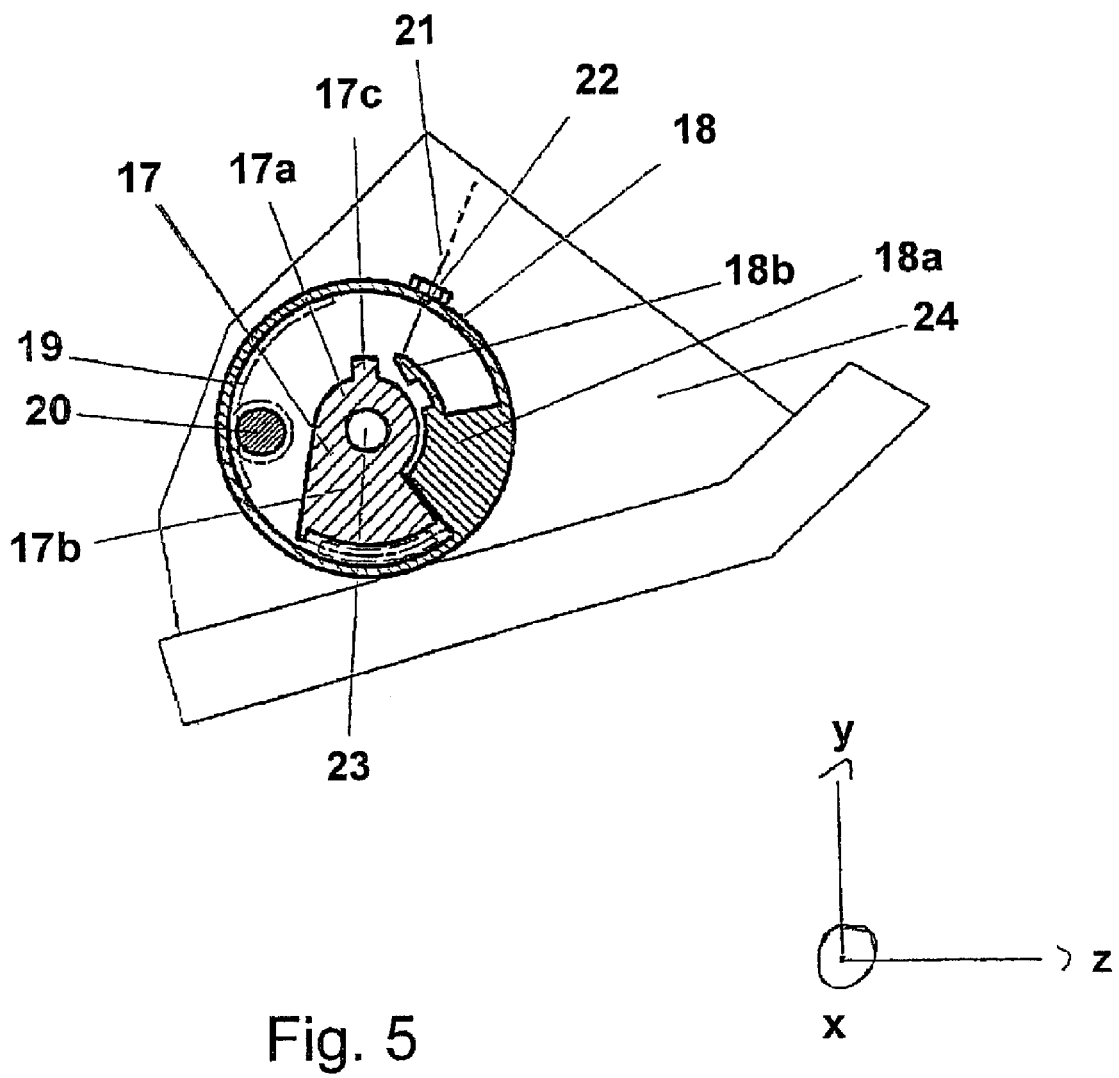
FIG. 5 shows an embodiment of the first and second holder with a lock according to a second embodiment, in side view.

FIG. 5 shows an embodiment of the first holder 17 and of the second holder 18 with a lock according to a second embodiment in side view. The second holder is hereby mounted on the cubby hole 5, the first holder 18 is mounted with the carrier 2 which is not illustrated here. The first holder has the shape of a cylinder 17a with a support tab 17 located at its border. A rectangular nose 17c is likewise located on the border of the first holder 17. The second holder 18 has the shape of a hollow cylinder with an inwardly projecting tab 18a. An overlap 18b with a rectangular opening is on this tab 18a. The overlap itself is connected to a Bowden cable 21 which is guided out of the second holder through an opening 22. Situated opposite the tab there is, likewise on the inner side of the hollow cylinder, a toothed structure 19 which extends partially beyond the inner edge. In this toothed structure 19, a silicone-damped toothed wheel 20 engages which is mounted on the carrier 2, not shown here in more detail.

The first holder 17 and the second holder 18 are mounted rotatably about an axis, not shown in more detail, the axis extending through a cylindrical opening 23 in the first holder 17. The first holder 17 and the second holder 18 are configured in this embodiment such that, in the opened state of the cubby hole 24, the support tab 17b located on the first holder comes to rest on the tab 18a located on the second holder, as illustrated in FIG. 5. In the closed state, the overlap 18b located on the second holder 18 overlaps the nose 17c located on the first holder 17, as a result of which locking of the rotational movement of the two holders relative to each other is effected.

In this embodiment, the first holder 17 is made of plastic material and the second holder 18 from plastic material. As an alternative, for example also metallic spring elements are suitable.

The nose 17c located on the first holder 17 is, on the one hand, stamped to be so weak that, as a result of in particular high pressure produced by impact of an occupant, the nose 17c is torn off by the overlap 18b, on the other hand, the constructional design takes into account misuse of force when opening the cubby hole 24. A rotational movement of the cubby hole is initiated by tearing off the nose 17c. As an alternative, the overlap can also be weakened such that the latter tears off at high pressure, another possibility would be for the overlap to have such a shape, for example the shape of a steep ramp, that the latter detaches at high pressure from the nose and initiates the rotational movement of the cubby hole 24.

Advantageously, the cubby hole is configured in such a manner that when struck by an occupant, in particular when struck by the knees, it can collapse. A cubby hole of this type has, according to the invention, a cover which forms the visible side of the cubby hole and an inner insert part disposed on the rear side of the cover.

For example, the inner insert part can have a box, trough or shell-like shape which is mounted for example by means of screws, clips or other attachment means on an essentially plate-like cover.

The inner insert part is, according to the invention, constructed in such a manner that it can collapse at the pressures discussed here. In order to make this possible; a foam material is used as material. PUR-, polystyrene-, PP- or PE-foam can be used for example for the inner insert part.

The cover itself is advantageously constructed in such a manner that it remains rigid at the discussed pressures relative to the inner insert part. In the case of impact on the cubby hole, only the inner insert part would therefore collapse. There are suitable as materials for the cover, for example unfoamed plastic materials, such as PP or PC/ABS.

In order to achieve the necessary force transmission to the holders or the carrier in order that the plastic deformation according to the invention of the holder and/or of the carrier or the rotation of the cubby hole can be exploited, advantageously the holder connected to the cubby hole is connected to the structure of the cubby hole which remains rigid even in the case of an impact, for example to the above-mentioned cover, in particular is integrated in the latter. As a connection there are suitable for example a welded connection, a screw connection, a riveted connection or an adhesive connection. The holder can also be moulded onto the structure of the cubby hole which remains rigid or even the holder and at least one partial region of the structure can be in one piece.

Alternatively, any cubby hole according to prior art, which is not provided for collapsing, can of course be used.

A further embodiment of the invention provides that the visible cover of the cubby hole is supported directly by its rear side on the carrier at least in the closed state of the cubby hole. In the case of impact on the cover of the cubby hole, the force is riot transmitted to the carrier or not only via the holders of the cubby hole cover but directly from the cubby hole cover to the carrier. In this case, it is possible in particular to provide the cover of the cubby hole preferably on the rear side with a ribbed structure which can transmit the forces acting on the cover specifically to the carrier, but keep the weight of the cubby hole low.

Basically, carriers with a pressed profile structure or cast profile structure are possible above all as deformable carriers in the sense of the invention. For example, a suitable carrier can have an aluminium cast profile.

The connection between the individual elements of the cubby hole device can be achieved in a manner known to the person skilled in the art in this field. The use of attachment means such as rivets or screws, and also integral connections, such as welding or gluing, or even also form-fitting connections are possible. A combination of these connection possibilities is likewise possible.

For example, the carrier can be connected to the outer frame via a screw connection, the carrier to the one holder via a form fit and also a screw connection, and the other holder to the cubby hole via a welded connection.

The pressures according to which the cubby hole device according to the invention is designed are based on the crash-norms Euro NCAP and FMVSS 208. The cubby hole device according to the invention is hence designed in its function, i.e., on the one hand, in deformation and, on the other hand, in the initiation of the rotational movement, in particular for impact forces in the range of 3.8 kN (Euro NCAP) to 10 kN (FMVSS 208). The pressure of the impact in the sense of the invention and the mentioned forces are thereby directly related to each other via the contact surface of the impacting person.

The cubby hole device according to the invention can be integrated into the inner cladding of a vehicle, in particular as a component of an instrument panel.

In this case, the cubby hole device would preferably be disposed on the passenger side at knee level, the outer frame of the cubby hole device if necessary being the transverse bearer.

The axis of rotation of the cubby hole which is defined by the holders is situated preferably below knee height and is offset forwards relative to the cubby hole, i.e. the direction of the engine compartment. In the case of impact, the knees of a passenger upon striking the cubby hole, if provided, would hence be able to initiate a deviating rotational movement of the cubby hole. On the other hand, the deformation of the carrier, the holder and/or the inner insert of the cubby hole alone can intercept the impact, which however can theoretically likewise be catered for.

The invention claimed is:

1. A cubby hole device for a vehicle, comprising:
   a cubby hole;
   a first holder;
   a second holder;
   a lock; and
   a carrier,
   wherein the carrier is connected to an outer frame and to one of the first and second holders,
   wherein the cubby hole is connected to the other of the first and second holders,
   wherein the first holder and the second holder are mounted rotatably against each other and, as a result of the lock, the first holder and the second holder are capable of being locked against each other, and
   wherein the cubby hole is displaceable against the outer frame by a pressure large enough to result in at least one of
   (a) the carrier is deformed plastically by the pressure,
   (b) the first holder is deformed plastically, and
   (c) the first holder is rotated against the second holder.

2. The cubby hole device according to claim 1, wherein the pressure is produced by an impact of a vehicle occupant on the cubby hole.

3. The cubby hole device according to claim 1, wherein the lock includes a displaceable bolt being guided in one of the first and second holders, the other holder having a retaining structure, and wherein the bolt is able to engage in the retaining structure in order to lock the first holder and the second holder against each other.

4. The cubby hole device according to claim 3, wherein the bolt is weakened such that the bolt is broken under the pressure on the cubby hole in order to initiate a rotational movement of the cubby hole.

5. The cubby hole device according to claim 3, wherein the retaining structure is weakened such that the retaining structure is broken under the pressure on the cubby hole in order to initiate a rotational movement.

6. The cubby hole device according to claim 1, wherein the lock includes a nose being provided on one of the first and second holders, and an overlap being provided on the other holder, and wherein the overlap is overlapping the nose in a locked state of the first and second holders.

7. The cubby hole device according to claim 6, wherein the overlap is weakened such that the overlap is broken under the pressure on the cubby hole.

8. The cubby hole device according to claim 6, wherein, the nose is weakened such that the nose is broken under the pressure on the cubby hole.

9. The cubby hole device according to claim 1, wherein (a) the carrier and (b) one of the first and second holders which is connected to the carrier are connected to each other in a form fit.

10. The cubby hole device according to claim 1, wherein one of the first and second holders which is connected to the carrier has a basic shape of a cylinder.

11. The cubby hole device according to claim 1, wherein one of the first and second holders which is connected to the carrier has one of at least one cam and at least one teeth on its border.

12. The cubby hole device according to claim 1, wherein if the carrier is to be deformed, the carrier comprises one of light metal, light metal foam, steel, plastic material, plastic material foam, plastic material composite materials and a composition of these materials.

13. The cubby hole device according to claim 1, wherein if one of the first and second holder which is connected to the carrier is to be deformed, the connected holder comprises one of light metal, light metal foam, steel, plastic material, plastic material foam, plastic material composite materials and a composition of these materials.

14. The cubby hole device according to claim 1, wherein the first holder and the second holder are mounted one in the other.

15. The cubby hole device according to 1, wherein a rotational movement of the first holder against the second holder is rotationally damped.

16. The cubby hole device according to claim 15, wherein the rotational damping is configured as a moveable, silicone-damped toothed wheel fitted on one of the first and second holders and a toothed structure is fitted on the other holder, and wherein the toothed wheel engages in the toothed structure.

17. The cubby hole device according to claim 1, wherein the cubby hole is a glove compartment in an instrument panel.

* * * * *